April 5, 1955  G. M. PHILLIPS  2,705,608
NON-CHATTERING PILOT CONTROLLED DIAPHRAGM VALVE
Filed June 11, 1952
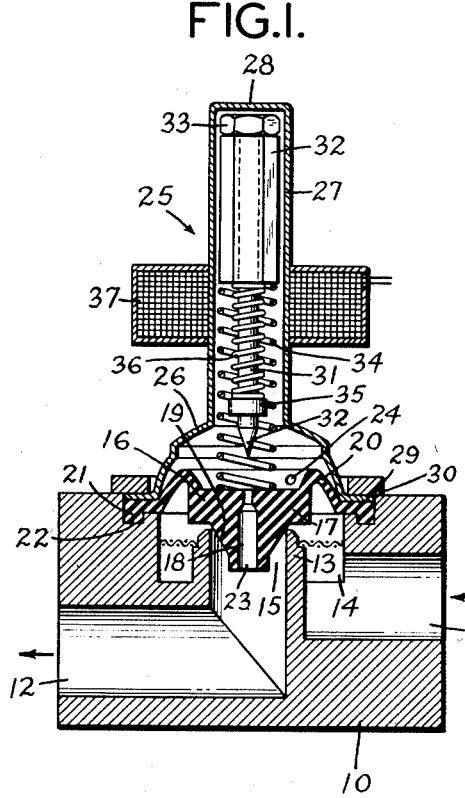
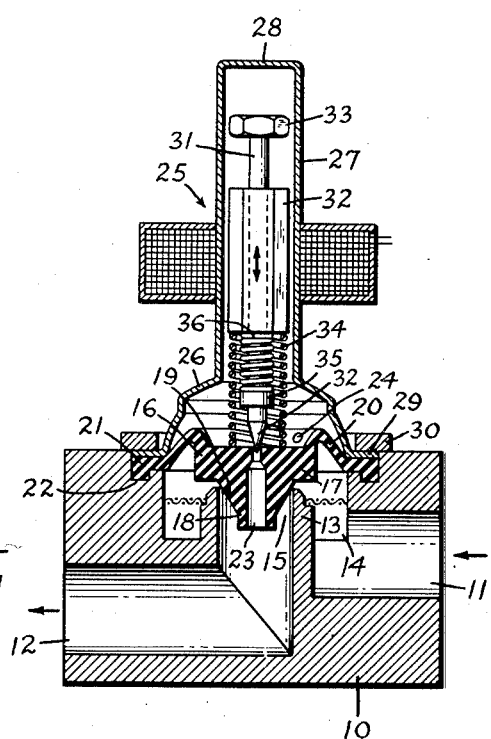
INVENTOR.
GLENN M. PHILLIPS
BY
HIS ATTORNEYS.

United States Patent Office 2,705,608
Patented Apr. 5, 1955

2,705,608

NON-CHATTERING PILOT CONTROLLED DIAPHRAGM VALVE

Glenn M. Phillips, Denver, Colo., assignor to The Refinite Corporation, Omaha, Nebr., a corporation of Nebraska Application June 11, 1952, Serial No. 292,851

4 Claims. (Cl. 251—30)

This invention relates to improvements in diaphragm-type valves and it relates particularly to an improved form of normally open, pressure-actuated and electromagnetically controlled valve.

The pressure-actuated, electromagnetically controlled diaphragm valves usually are constructed so that the valve is normally closed when the electromagnet is de-energized and opened when the electromagnet is energized. Such valves have a wide variety of uses but they are not entirely satisfactory when used in a system that requires one or more of these valves to be maintained open over extended periods of time. To maintain the valves open, it is necessary to keep the electromagnet energized with the result that the electromagnet tends to become heated and, moreover, the vibration of the armature sets up annoying hum in the system when alternating current is used for energizing the magnet, as is usually the case.

There is a demand for a normally open type of diaphragm valve for use, for example, in automatic water softening systems wherein both normally closed and normally open valves are used to control the zeolite regenerating cycle. Attempts have been made heretofore to provide normally open types of diaphragm valves but the results have not been all that might be desired because valves of this type also have a tendency to chatter or hum and set up a vibration in the water distributing system while the electromagnet is energized to close the valve.

The present invention provides a normally open diaphragm-type valve which is free from annoying chatter or hum and is operable efficiently and effectively throughout a long operating life with a minimum of attention and adjustment.

More particularly, valves embodying the present invention are provided with an armature separate from the needle valve which controls the action of the diaphragm so that the armature can vibrate relative to the needle valve under the influence of the alternating field set up by alternating current in the electromagnet without causing a chattering of the diaphragm on the valve seat and the resulting hum produced by vibration of the needle valve itself.

For a better understanding of the present invention, reference may be had to the accompanying drawings, in which:

Fig. 1 is a view in vertical section through a typical valve of the diaphragm type embodying the present invention shown with the valve in its normally open position; and Fig. 2 is a similar view in section of the valve shown in its energized and closed position.

The valve chosen for purposes of illustration is of a known and commercially available type which is modified to embody the novel structure characterizing the present invention.

As shown in Figs. 1 and 2, the valve may include a valve block or casing 10 which is provided with an inlet passage 11, an outlet passage 12 and a generally tubular or annular valve seat 13 interposed between the inlet and the outlet. The inlet 11 communicates with the outlet 12 through a bore 14 in the upper surface of the casing 10 which communicates with the opening 15 enclosed by the valve seat 13.

Cooperating with the valve seat is a diaphragm valve member 16 of a conventional type which includes a thickened disc-like center portion 17 engageable with the edge of the valve seat 13 to shut off communication between the inlet port 11 and the outlet port 12. The disc-like center portion 17 may be formed of rubber and has a tubular stem portion 18 provided with a conical portion 19 engageable with the seat 13. The center portion 17 of the diaphragm is supported by a flexible rim portion 20 which is bent upwardly and then downwardly and is provided with a marginal flange 21. The flange 21 of the diaphragm is received in a groove 22 in the upper surface of the casing 10. As is usual with diaphragms of this type, it is provided with a central opening 23 and a laterally positioned passage 24. The passage 24 permits the liquid from the inlet port 11 to leak above the diaphragm and force it against the valve seat when the central opening 23 is closed. When the opening 23 is open, liquid leaks through the opening from above the diaphragm to the outlet 12 so that the diaphragm is subjected to equal pressures on its opposite sides.

In the form of the valve illustrated, the diaphragm 16 is normally positioned so that it is spaced from the valve seat about .040 to .060 inch to avoid chatter. The resiliency of the diaphragm 16 permits it to move into engagement with the valve seat when the opening 23 in the diaphragm is closed. The diaphragm can also move away from the seat 23 a greater distance than its normal spacing to permit full flow of the liquid through the seat.

The upper surface of the diaphragm 16 is enclosed in a casing or housing 25 having a dome-shaped portion 26 and an upwardly extending hollow tubular portion 27 having a closed upper end 28. The dome-shaped portion is provided with a marginal flange 29 which is clamped against the rim 21 of the diaphragm by means of a retaining ring 30 to maintain a leak-tight relation between the diaphragm and the upper casing 25 and the lower casing 10.

As is usual with valves of this general type, the opening 23 in the diaphragm 16 is closed and opened by means of a plunger 31 having a needle valve point 32 thereon. When the needle valve point enters the upper end of the opening 23, it blocks the flow of liquid through the valve so that the fluid pressure on the upper surface of the diaphragm forces the latter into engagement with the valve seat 13.

In accordance with the present invention, the plunger 31 extends generally axially of the tubular extension 27 and carries slidably an armature member 32 of generally tubular form. The upper end of the plunger 31 is provided with a head 33 which limits the upward movement of the armature 32.

The armature 32 and the needle valve plunger 31 are normally biased upwardly by means of a helical spring 34 which bears against the upper surface of the diaphragm and the lower end of the armature 32. The spring 34, therefore, normally tends to keep the needle valve out of engagement with the diaphragm while the diaphragm remains spaced from the valve seat 13 as explained previously.

The plunger 31 is provided with a flange or collar 35 against which bears a light spring 36. The upper end of the spring 36 also engages the lower end of the armature 32 so that the latter is normally urged against the head 33 on the needle valve plunger.

The tubular extension 27 is disposed centrally of and supports an electromagnet 37 in the form of a coil or winding adapted to be connected to a suitable source of alternating current.

When the electromagnet is energized by alternating current, the field of the magnet urges the armature 32 downwardly and also sets it into an axial vibration due to the alternating current field. The downward movement of the armature 32 compresses the spring 34 and also compresses the spring 36 so that the latter urges the plunger 31 downwardly to engage its point 32 in the upper end of the opening 23. Inasmuch as opening 23 is closed, the pressure of the fluid exerted on the top of the diaphragm forces the latter into contact with the seat. No vibration of the needle valve plunger takes place due to the alternating magnetic field because the armature 32 is free to vibrate relative to the plunger. The spring connection between the plunger 31 and the armature 32 absorbs the vibration of the armature and eliminates the humming which otherwise would be produced by bouncing or vibration of the plunger 31.

While the invention has been described with reference to a known type of diaphragm construction, it will be understood that the needle valve and armature construction described above is equally applicable to other types of diaphragms and diaphragm valves and, therefore, the form of the invention described should be considered as illustrative and not as limiting the scope of the following claims.

I claim:

1. A diaphragm valve comprising a first casing having an inlet, an outlet and an annular valve seat therebetween, a flexible diaphragm in said casing and movable into and out of engagement with said valve seat to disconnect said inlet from said outlet, a passage through said diaphragm to admit liquid to the opposite side of said diaphragm from said seat, an opening in said diaphragm in alignment with said seat to discharge liquid from said opposite side through said outlet, a second casing enclosing the side of said diaphragm opposite from the valve seat, a valve plunger reciprocable in said casing into and out of engagement with said diaphragm to close and open said opening, respectively, means on at least one of said casings supporting said diaphragm in spaced relation to said seat when the valve plunger is out of engagement with the diaphragm, an armature slidably mounted on said plunger for movement toward and away from said diaphragm, a stop member on the opposite end of the plunger from said diaphragm for engagement by said armature, a first spring interposed between said plunger and said armature urging said armature against said stop member, a second spring biasing said armature and said plunger away from the diaphragm, and an electromagnet on said second casing to move said armature toward said diaphragm and engage said plunger therewith, upon energization of said electromagnet.

2. A diaphragm valve comprising a first casing having an inlet, an outlet and an annular valve seat therebetween, a flexible diaphragm in said casing and movable into and out of engagement with said valve seat to disconnect said inlet from said outlet, a passage through said diaphragm to admit liquid to the opposite side of said diaphragm from said seat, an opening in said diaphragm in alignment with said seat to discharge liquid from said opposite side through said outlet, a second casing enclosing the side of said diaphragm opposite from the valve seat, a valve plunger reciprocable in said casing into and out of engagement with said diaphragm to close and open said opening, respectively, means on at least one of said casings supporting said diaphragm in spaced relation to said seat when the valve plunger is out of engagement with the diaphragm, an armature slidably mounted on said plunger for movement toward and away from said diaphragm, a stop member on the opposite end of the plunger from said diaphragm for engagement by said armature, a first spring interposed between said plunger and said armature urging said armature against said stop member, a second spring interposed between said armature and said diaphragm for biasing said armature and said plunger away from the diaphragm, and an electromagnet on said second casing to move said armature toward said diaphragm and engage said plunger therewith, upon energization of said electromagnet.

3. A diaphragm-type valve comprising a first casing having an inlet, an outlet and an annular valve seat therebetween, a flexible diaphragm adjacent to said seat, said diaphragm having an opening therethrough in alignment with said valve seat and a laterally positioned passage therethrough communicating with said inlet, a second casing enclosing the side of the diaphragm opposite from the valve seat, a needle valve plunger slidable axially in the last-mentioned casing to engage said diaphragm and close said opening and to move away from said diaphragm to leave said opening open, means on at least one of said casings supporting said diaphragm in spaced relation to said seat when the opening in said diaphragm is open, a tubular armature member slidably mounted on said plunger for axial movement relative thereto, a first spring interposed between said plunger and said armature urging the latter away from said diaphragm, a second spring interposed between said diaphragm and said armature urging them apart, a stop member on the end of said plunger remote from said diaphragm to be engaged by said armature to enable said second spring to maintain said plunger out of engagement with said diaphragm, and an electromagnet mounted on said second casing and urging said armature and said plunger by means of said first spring toward said diaphragm when said electromagnet is energized.

4. A diaphragm-type valve comprising a first casing having an inlet, an outlet and an annular valve seat therebetween, a flexible diaphragm adjacent to said seat, said diaphragm having an opening therethrough in alignment with said valve seat and a laterally positioned passage therethrough communicating with said inlet, a second casing enclosing the side of the diaphragm opposite from the valve seat, a needle valve plunger slidable axially in the last-mentioned casing to engage said diaphragm and close said opening and to move away from said diaphragm to leave said opening open, means on at least one of said casings supporting said diaphragm in spaced relation to said seat when the opening in said diaphragm is open, a tubular armature member slidably mounted on said plunger for axial movement relative thereto, a stop member on the outer end of said plunger to engage said armature, a first spring on said plunger urging said armature against said stop member, a second stronger spring engaging said armature and urging it and said plunger away from said diaphragm and an electromagnet on said second casing for moving said armature toward said diaphragm to engage said plunger with said diaphragm and close said opening when said electromagnet is energized.

References Cited in the file of this patent

UNITED STATES PATENTS

| 1,989,341 | Shenton | Jan. 29, 1935 |
| 2,222,419 | McCarty | Nov. 19, 1940 |
| 2,291,599 | Ray | Aug. 4, 1942 |
| 2,562,315 | Kempton | July 31, 1951 |
| 2,654,393 | Ghormley | Oct. 6, 1953 |